July 14, 1959  W. L. GILL  2,894,524

SAFETY VENT CAPS

Filed Feb. 6, 1956

INVENTOR.
WALTER L. GILL,
BY Shepherd F Campbell
ATTORNEYS

United States Patent Office 2,894,524
Patented July 14, 1959

2,894,524
SAFETY VENT CAPS

Walter L. Gill, Redlands, Calif., assignor to Gill Electric Manufacturing Corporation, a corporation of California Application February 6, 1956, Serial No. 563,522

3 Claims. (Cl. 137—43)

This invention relates to vent caps for wet storage batteries and more particularly to storage batteries which operate under widely varying external pressure conditions or in places where they are subjected to tipping and sometimes to complete inversion.

Vent caps for airplane storage batteries are commonly provided with valvular means which open to permit escape of gases when the battery is in an upright position but which close to prevent the escape of the electrolyte when the battery is tipped beyond a predetermined degree, or is inverted. Further, to prevent internal battery pressures from continuing to hold the valvular means closed, even after the battery returns to an upright position, some vent caps have included high and low pressure valves in their make up; the high pressure valve being of relatively small area in comparison with the low pressure valve so that the high pressure valve may be more easily forced from its seat to initially release a high pressure, after which the large area low pressure valve is moved to open position to uncover a relatively large capacity escape channel through which the generated gases freely pass in the normal operation of the battery. Such an arrangement is shown in the United States Patent number 2,717,610, issued to me on September 13, 1955.

The device disclosed in this application aims to add to a vent cap of the aforesaid general nature, safety valve elements operable under the influence of an excess internal pressure in the battery to bring additional escape ports into action. Thus the possibility of enough internal pressure building up in a battery cell to burst said cell is definitely eliminated.

In addition to the foregoing general object, this invention aims to utilize certain of the elements of the low pressure valve in providing the safety valve referred to.

Figure 1:
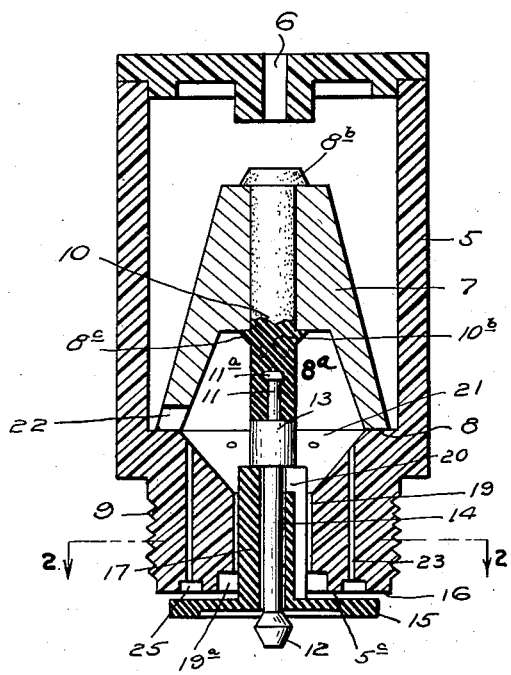
Figure 2:
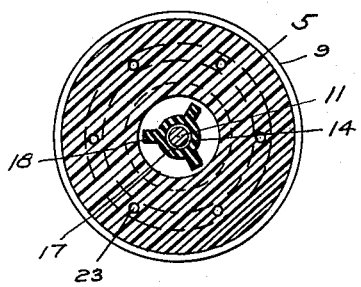
Figure 3:
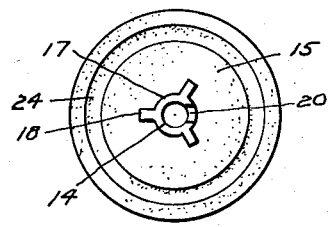
Figure 4:
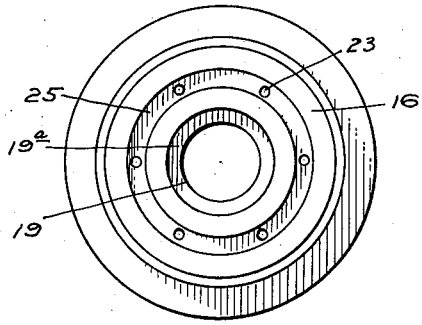

In the accompanying drawing:

Figure 1 is a somewhat enlarged central vertical sectional view of a vent cap embodying the invention, Figure 2 is a horizontal sectional view upon line 2—2 of Figure 1, Figure 3 is a topside or plan view of the low pressure disc valve showing the same slightly modified to include a circumferential groove, hereinafter described, and Figure 4 is a bottom view of the main casing, upon which the low pressure, rubber valve, seats.

Like numerals designate corresponding parts in all of the figures of the drawing.

In the drawing 5 designates a casing of any suitable dielectric material, such as hard rubber or any suitable plastic such as the well known phenolic compositions. The top of the casing is closed by a cap having a vent opening 6 formed therein. Located within the casing is a weight 7, preferably of lead or any other suitable heavy and acid proof material and preferably though not necessarily in the form of a truncated cone. The lower outer edge of the weight seats upon an internal ledge or annular seat 8 of casing 5, whereby when the battery is upright the weight is held in position to axially align with casing 5.

The lower portion of the casing is reduced and externally threaded, at 9, to adapt it to be screwed into the filler opening of a battery cell, in a well known way.

The weight may be and preferably is, provided with an underside cavity 8a. Thus the center of gravity of the weight is raised and its sensitivity to tipping influences, in all directions, is correspondingly increased.

In the particular embodiment of the invention which I have chosen for purposes of illustration but to which the safety valve features are not necessarily limited, the weight has a valve stem carrying element secured axially therein. The upper part of this carrying element consists of a relatively thick rubber member 10, which may be cemented in the weight or held in place by protuberant portions 8b, 8c, which engage above and below the weight. A slender, metallic stem 11, carrying at its lower end the high pressure valve 12, projects from the lower end of the member 10. A collar 13 on stem 11 abuts against the lower end of the member 10 and the part of the stem above the collar is gripped securely in the lower portion of member 10. The top of the stem may carry a head 11a to aid in securing said stem against endwise movement in member 10. The stem 11 terminates far enough below the point at which the carrying element leaves the top of cavity 8a to leave a bendable part 10b of the rubber element or member, so that tipping of the weight will not impart undue lateral drag upon the valves, hereinafter described. The lower part of the metallic, acid resistant valve stem 11 passes through the bore 14 of the low pressure valve. This low pressure valve comprises the flat, disc-like portion 15, which lies below and seats upon the flat under face 16 of casing 5, and an upstanding shank 17, both the shank and disc being, preferably, made of rubber or like flexible and elastic material. The shank carries radial guide ribs 18, which guide the valve in the relatively large vertical hole or bore 19, formed axially through the bottom of casing 5, and the spaces between which ribs permit the passage of gas upwardly through said bore 19. One or more lateral channels 20 in the top of shank 17 permit the escape of gases into cavity 21 of casing 5. From this cavity the gas passes through channel 22 in weight 7, to the upper part of the casing and out of vent opening 6.

The operation of the parts so far described is as follows:

As long as the battery is in upright position and the weight is seated on seat 8, both the high and low pressure valves are open and the gases generated escape freely as described. When the battery is tipped beyond a predetermined degree the weight rocks upon its seat and the valve stem 11 is drawn upon to first move the small area, high pressure valve 12 to a seating upon its seat at the lower end of bore 14 in the low pressure valve and to then draw the larger area low pressure disc valve 15 to its seating upon the bottom of casing 5. This results in preventing any escape of the electrolyte even if the battery be completely inverted. When the battery returns to upright position and the weight moves toward its seating upon seat 8, the high pressure valve is first moved from its seat upon the low pressure valve to initially release any excessive pressure which might tend to keep the valves closed even against the weight action. Then the low pressure valve is opened as the weight completes its seating movement.

The present application discloses means whereby additional escape channels are provided, which are brought into action if pressures high enough to prevent opening of both the high and low pressure valves, are ever built up in the battery and which pressures might burst the cells if not relieved. These additional escape channels and the control means therefor constitute a safety valve structure that is in addition to the high and low pressure valve structures previously described. However, as will be presently seen the low pressure valve disc is caused to serve the additional function of acting as an element of the safety valve arrangement.

To secure this desirable result the bore 19 is counterbored at its lower end, as at 19a to provide a cavity having a diameter somewhat in excess of the diameter of bore 19. In the presence of excessively high pressure in the cell the central part of valve disc 15 is forced by said pressure, upwardly into said cavity 19a. This, with rim 5c as a fulcrum, rocks the outer portion of the valve disc away from the bottom of casing 5 and permits the gas pressure to escape through a row of vertical ports 23 disposed at spaced intervals around casing 5 and which ports pass from the lower face of casing 5 to cavity 21. Means are provided for bringing all of these ports into gas conducting action if valve 15 be forced from its seat at even only one point. This may be accomplished either by forming a circumferential concentric groove or channel 24 in the upper face of the valve disc 15 (Figure 3) into which all of ports 23 open, or by forming a like groove or channel 25 in the underface of casing 5 into which the lower ends of all of ports 23, open (Figures 1 and 4). It is clear that in either case any gas entering either of the grooves or channels will find ample avenue of escape through the row of vertical ports 23. While the described arrangement is very economical of construction and highly efficient in action the invention is not limited to the particular construction described because as far as I know I am the first to embody in a vent cap the high and low pressure valves operating as described and to, in addition, provide a safety valve automatically operable to relieve dangerous pressures, to wit, those severe enough to hold said valves closed against the action of the normal operating means of said valves, to wit, the weight. This provision of a safety valve operable under pressures which are holding another relief valvular means closed is of utility in connection with either a two valve vent cap, to wit one having the high and low pressure valves described, or in connection with a single valve vent cap, the latter being common in the art.

The pressure at which the safety valve will function may be gauged and determined by the diameter of the counterbore 19a. The larger the counterbore the lower the pressure required to uncover the vertical channels 23 because the larger the diameter of the counterbore the larger the area of the disc valve that is unsupported by a wall behind it and the farther the fulcrum 5c is shifted outwardly. In the normal operations of the device the high and low pressure valves are merely moved to closed position by and upon tipping of the weight beyond a predetermined degree and said valves open without difficulty when the weight returns to upright position, the safety valve then performing no function. The safety valve functions only when the inversion of the vent cap structure along with inversion of the airplane, has been continued over such a long period of time that pressure builds up in the battery cells below the vent cap and upon the underside of the valves to such a point as to overcome and hold the weight elevated against the gravitational force which seeks to return the weight and valves to valve opening position. Consequently there is a definite and coactive relation between the weight and that part of the disc 15 which lies outwardly of annular rim 5c to wit the safety valve element, in that this element is caused to function and relieve extra high pressure when said pressure prevents the return movement of the weight, under gravity. Thus the disc 15 serves to provide a primary low pressure valve part which controls bore 19, and also a secondary safety valve part which controls ports 23, but both the primary and secondary valve parts are actuated to open position by the weight. Only a pressure great enough to hold the weight elevated against the force of gravity will bring about opening of the safety or secondary valve part.

Since it is clear that the desired results may be had by structures other than those illustrated it is to be understood that the invention includes within its purview whatever changes fairly come within either the terms or the spirit of the appended claims.

I claim:

1. A vent cap of the character described comprising a casing, a tiltable weight therein, a high pressure valve of small area and a low pressure valve of larger area, said valves being actuated to closed position by tilting of said weight, said casing having a hole or bore formed therein which extends from the underface of the casing to the interior of the casing, the low pressure valve being of disc form and seating upon the under face of the casing to prevent escape of fluid through said bore, an additional gas escape channel leading from the underface of said casing to the interior thereof which channel is overlapped and closed by the low pressure disc valve when the latter is in closed position, the casing being provided with a cavity above the inner portion of the disc valve into which such inner portion of the disc may be forced by abnormally high pressure, to thereby flex the disc valve and move its outer portion to uncover the additional gas escape channel.

2. A structure as recited in claim 1 wherein the seat for the low pressure valve upon the under face of the casing, is in the form of an annulus which separates said bore from the gas escape channel and which annulus serves as a fulcrum in the movement of the outer portion of the disc when the inner portion of the disc is flexed under such abnormally high pressure.

3. A vent cap of the character described comprising a casing, a tiltable weight therein, a high pressure valve of small area and a low pressure valve of larger area, said casing having a hole or more formed therein which extends from the underface of the casing to the interior of the casing, the low pressure valve seating upon the underface of the casing and controlling said bore, said low pressure valve having a port extending vertically therethrough and having a valve seat at its lower end with which the small area high pressure valve engages, means connecting the high pressure valve with the weight through which tilting of the weight moves the high pressure valve to its seat upon the low pressure valve and then draws upon both valves to move the low pressure valve to its seating position by the tipping of the weight, a safety gas escape port, a safety valve element which seats upon and controls the safety gas escape port, and means operable by movement of the low pressure valve under excess pressure upon the underside of the low pressure valve and which pressure is great enough to hold the weight elevated against gravity, to effect movement of the safety valve element to uncover said safety gas escape port and permit the escape of such excess pressure.

References Cited in the file of this patent
UNITED STATES PATENTS

| 2,016,278 | Ehlers | Oct. 8, 1935 |
| 2,684,683 | Brown | July 27, 1954 |
| 2,717,610 | Gill | Sept. 13, 1955 |

FOREIGN PATENTS

| 653,583 | Great Britain | May 16, 1951 |